(12) United States Patent
Coenen et al.

(10) Patent No.: US 7,843,098 B2
(45) Date of Patent: Nov. 30, 2010

(54) METHOD FOR OPERATING AN ELECTROMOTIVE DRIVE

(75) Inventors: Norbert Coenen, Mönchengladbach (DE); Marco Linke, Geeste (DE)

(73) Assignee: Oerlikon Textile GmbH & Co. KG, Monchengladbach (DE)

( * ) Notice: Subject to any disclaimer, the term of this patent is extended or adjusted under 35 U.S.C. 154(b) by 323 days.

(21) Appl. No.: 11/988,523

(22) PCT Filed: Jun. 28, 2006

(86) PCT No.: PCT/EP2006/006228

§ 371 (c)(1),
(2), (4) Date: Jan. 9, 2008

(87) PCT Pub. No.: WO2007/006420

PCT Pub. Date: Jan. 18, 2007

(65) Prior Publication Data

US 2009/0134727 A1 May 28, 2009

(30) Foreign Application Priority Data

Jul. 9, 2005 (DE) .................. 10 2005 032 184

(51) Int. Cl.
*H02K 7/09* (2006.01)
*H01H 47/00* (2006.01)
(52) U.S. Cl. ...................... 310/90.5; 361/144
(58) Field of Classification Search ............... 310/90.5; 361/144, 146
See application file for complete search history.

(56) References Cited

U.S. PATENT DOCUMENTS

| 5,844,339 | A  | * | 12/1998 | Schroeder et al. | 310/90.5 |
| 6,353,273 | B1 |   | 3/2002  | Heshmat et al.   | 310/90.5 |
| 6,373,159 | B1 | * | 4/2002  | Shinozaki        | 310/90.5 |
| 6,516,601 | B2 | * | 2/2003  | Coenen           | 57/406   |
| 6,653,756 | B2 | * | 11/2003 | Ueyama et al.    | 310/90.5 |
| 6,657,345 | B2 | * | 12/2003 | Shinozaki        | 310/90.5 |
| 6,770,993 | B1 |   | 8/2004  | Heshmat et al.   | 310/90.5 |
| 2002/0002816 | A1 | | 1/2002  | Coenen           | 57/404   |

FOREIGN PATENT DOCUMENTS

DE 35 23 344 A1 1/1987
EP 1 154 340 A1 11/2001

* cited by examiner

*Primary Examiner*—Quyen Leung
*Assistant Examiner*—Eric Johnson
(74) *Attorney, Agent, or Firm*—K & L Gates LLP

(57) ABSTRACT

A method for operating an electromotive drive of a textile machine, comprising a contactlessly mounted rotor and catch bearings. The rotor rests on one catch bearing prior to initial operation, and is spaced therefrom by an air gap during stationary operation. A control device allows the rotor to be held in a force-free floating state during stationary operation. The method executes the following steps: (a) inputting an output signal from the control device for maintaining the force-free floating state during operation; (b) calculating the air gap by evaluating the output signal; (c) comparing the calculated value with predetermined limit values; and (d) deactuating the drive when the limit values are passed. The control device comprises a position sensor with at least one sensor coil, at least one actuator coil, a position controller and an integrator, at which the output signal is obtained to determine the air gap.

20 Claims, 1 Drawing Sheet

METHOD FOR OPERATING AN ELECTROMOTIVE DRIVE

CROSS-REFERENCES TO RELATED APPLICATIONS

This application claims the benefit of German patent application DE 10 2005 032 184.4, filed Jul. 9, 2005, herein incorporated by reference.

BACKGROUND OF THE INVENTION

The present invention relates to a method for operating an electromotive drive as well as to an electromotive drive for carrying out such method.

When using a contactlessly mounted rotor, which is configured as a rotor of an electromotive drive revolving at a high rotational speed, it is of particular interest to prevent the rotor contacting the catch bearings due to external process and disturbing forces acting on it. The rotor contacting the catch bearings involves the risk that the kinetic energy of the rotor being released will lead to premature wear of the catch bearings through to mechanical destruction of the catch bearings and/or the entire inner drive assembly.

Knowledge of the spacing of the bearing air gaps is sensible in particular in the case of occurring process and disturbing forces in order to promptly initiate switching off of the electromotive drive before contact between the rotor and catch bearing. A disturbing force of this type may result, in rotors which are used for textile machines, for example, from a thread accumulation being deposited on the shaft of the rotor between the bearing magnets and exerting an axially directed force on the rotor and displacing it from the force-free floating state occurring in stationary operation in the direction of one of the catch bearings. This disturbing force is counteracted by corresponding activation of a control device, with the result that with a lack of knowledge of the remaining bearing air gap, the rotor may be pressed against one of the catch bearings and this may result in damage to the drive.

It is known from the published application German Patent Publication DE 35 23 344 A1, to use gap sensors which measure absolutely to determine the bearing air gap of a contactlessly mounted rotor of an electromotive drive, which sensors are in a position to precisely indicate, without delay and by measurement techniques gap deviations of about 1% of the nominal value by means of an electric signal. The use of absolutely measuring gap sensors is disadvantageous in that absolutely measuring gap sensors with a small offset error and very high measuring precision are expensive and require a high outlay for adjustment. The constantly present offset error of the gap sensors means that the rotor is displaced from its force-free floating state. This results in a constantly flowing current to compensate the offset error.

The use of more economical gap sensors is linked with the disadvantage that these have a larger offset error. On the one hand, with large offset errors of the gap sensors a very large current flows, which in some circumstances can exceed the power limits of the control device. On the other hand, a position displacement of the rotor from its force-free floating state takes place, so the catch bearings may be approached too closely or there may even already be contact in the extreme case.

SUMMARY OF THE INVENTION

The object of the present invention is therefore to provide a method for operating an electromotive drive, which in a simple and economical manner allows the determination and monitoring of the bearing air gap during stationary operation, as well as an electromotive drive, which is distinguished by increased operating safety.

The object is achieved in terms of a method for operating an electromotive drive, in particular a single drive of a textile machine, comprising a contactlessly mounted rotor, catch bearings, wherein the rotor rests on one of the catch bearings prior to initial operation of the electromotive drive, and from which the rotor is spaced apart during stationary operation by a bearing air gap. A control device allows the rotor to be held in a force-free floating state during stationary operation. The inventive method is characterized by the following steps: (a) inputting an output signal (ASI) generated by the control device for maintaining the force-free floating state during operation; (b) calculating the bearing air gap by evaluating the output signal (ASI); (c) comparison of the calculated value for the bearing air gap with predeterminable limit values; and (d) switching off the electromotive drive when the limit values are passed. The present invention also provides an electromotive drive characterized in that the control device comprises a position sensor with at least one sensor coil, at least one actuator coil which can be provided with electrical energy in a defined manner, a position controller and an integrator, at which the output signal (ASI) can be picked up to evaluate and calculate the bearing air gap.

During operation, an output signal generated by the control device to maintain the force-free floating state is input. The bearing air gap is calculated here by evaluating the output signal. The values determined from the evaluation of the output signal for the bearing air gap are compared with the limit values determined at the outset. When the limit values determined for the bearing air gap have been passed, the electromotive drive is switched off, so damage to the catch bearings or the entire inner drive assembly can be substantially avoided.

The switching off due to the limit values of the bearing air gap being passed can be recorded and displayed by suitable means, so an analysis of the switching off process of the electromotive drive is made possible.

The substantial advantage of the method according to the invention is that disturbing or process forces occurring, which exert an axially directed force on the rotor and thus displace it from its force-free floating position (neutral position), can be compensated by a corresponding activation of the control device up to an instant at which the initially determined limit values of the spacing of the bearing air gap are passed, which leads to the switching off of the electromotive drive and therefore to an increase in the operating safety.

Furthermore, according to the inventive method, the bearing stops can be measured to determine the extreme values of the bearing air gap prior to each run-up of the electromotive drive to determine predeterminable limit values. The rotor thus scans the end stops of the catch bearings here and this can be achieved by a suitable activation of the rotor by means of the control device. At the instant of initialization, the outer process forces, which act on the rotor, approach zero, as the motor is not driven at the instant of initialization, so the output signal (ASI) generated by the control device to maintain the force-free floating state is determined exclusively from the negative rigidity of bearing means used for the contactless mounting of the rotor. Thus, the extreme values of the bearing stops are determined. The extreme values determined again before each run-up of the electromotive drive, as well as the calculation of the bearing air gaps, with a suitable recording of the determined values, allow an analysis of the operating behaviour of the electromotive drive.

In this case, the predeterminable limit values may be established below the initially determined extreme values. In this manner, it may be ensured that in the case of a switching off, up to the instant of the switching off, an adequate safety spacing from the catch bearings is ensured. For this purpose, the limit value may be determined from the difference in the size of the bearing air gap obtained using the measured extreme values and a predeterminable reduction to increase the operating safety, for example up to a third of the size of the bearing air gap.

Furthermore, after each switching off of the electromotive drive, the measurement of the bearing stops can be carried out before the electromotive drive is started up again. In this manner, the bearing air gap limit values are determined again individually by the method described at each starting process. In addition, the constantly present offset errors are thus compensated by the control device. The predetermination of the limit values constantly taking place can be used as a diagnostic tool with regard to the wear of the catch bearings and/or the bearing means state evaluation, in that the extreme values measured for the limit value determination are recorded. Changing the extreme values, for example because of catch bearing wear, allows conclusions about the state of the bearing means used and in particular of the catch bearings.

It can advantageously be provided, that prior to the run-up of the rotor, a reference value of a working point of the rotor in the floating state can be determined, so a working point which is established during stationary operation and differs from this reference value is determinable. It can thus be achieved that a weakening which becomes established of the bearing means used for contactless mounting, which may occur during ageing of the drive, becomes determinable. For this purpose, it is provided that the reference value can be determined from the average value of the spacing of the rotor from the catch bearings. This procedure allows assessment of the state of the bearing means during running operation.

In particular, the reference value of the working point of the rotor in the floating state can be predetermined when the rotor has achieved its operating speed. In this manner, the process forces occurring on reaching the operating speed, which can lead to a working point displacement, are taken into account without the deviation from the working point, caused by process forces, leading to the electromotive drive being switched off on reaching the operating speed.

Furthermore, the switching off of the electromotive drive can be brought about by a defined deviation of the working point being adjusted from the reference value in order to rule out damage to the catch bearings or the entire inner drive assembly. Moreover, it may be provided that the deviation of the working point being adjusted from the reference value is signaled in an appropriate manner to promptly draw attention to wear indications of this type.

The output signal (ASI) for small bearing air gaps may advantageously be linearised so the bearing air gap value calculated from the linearisable output signal (ASI) can be used in the catch bearing adjustment as the quality criterion.

Furthermore, the control device for evaluating the output signal (ASI) may be in operative connection with a control arrangement. In this case, to amplify the output signal (ASI), the control arrangement may have an amplifier. This may be used, in particular with small differences between the positions of the rotor, to amplify the signal to be picked up to monitor the bearing air gap, it being possible for the amplifier to shift the level of the output signal (ASI). The output signal (ASI) amplified in this manner, of the control device, is in a range which is sensible in terms of measuring techniques, so an adequately high resolution of the output signal (ASI) of the control device is achieved to reach the measuring precision necessary for monitoring.

In particular, the input of the amplifier may be acted upon by an additional, pulse width-modulated signal, which is generated by the control arrangement. This additional, pulse width-modulated signal is used to compensate the offset of the position sensor, which enters the output signal (ASI). The offset corresponds to the compensation voltage of the offset correction of the position sensor. This is substantially the base offset error of the control device.

Moreover, the additionally occurring temperature drift may be compensated. For this purpose, the pulse width modulation of the additional signal may be changed during the transition of the operating state of the electromotive drive from the instant of the run-up until the stationary operating state is reached to compensate the occurring deviations from the state of equilibrium in the floating state of the rotor, in such a way that the additional, pulse width-modulated signal intervenes in a compensating manner in the control arrangement, in a delayed manner. In this manner, a drift occurring due to temperature changes, in the run-up of the rotor until the operating temperature is reached in stationary operation, which results in a displacement of the neutral position and the offset error of the control device, is compensated in a temporally delayed manner. If, for example, axial forces occur due to a disturbance, for example, which mean that one of the limit values is passed, these are recognized despite the compensation of the temperature drift, because these disturbing forces act more rapidly in terms of time than the temporally delayed compensation acts.

According to claim 14, the control device comprises a position sensor with at least one sensor coil, at least one actuator coil which can be provided with electric energy in a defined manner, a position controller and an integrator, at which the output signal (ASI) can be picked up to evaluate and calculate the bearing air gap.

Furthermore, the control device may be connected to a control arrangement to evaluate and calculate the output signal (ASI). The control arrangement may comprise a digital control unit, for example in the form of a computer or microprocessor.

Furthermore, the control arrangement may comprise an amplifier, an analogue/digital converter and a digital/analogue converter, by means of which the digital control unit can be connected to the control circuit. The amplifier is configured in such a way that it raises or lowers the output signal of the control device to a voltage level which corresponds to the measuring arrangement, as the operating voltages of the control device, on the one hand, and of the control arrangement to evaluate the output signal (ASI), on the other hand, may be different. The analogue/digital converter is used to convert the analogue signals into digital signals which can be processed by the control arrangement, if digital signals are not already provided by the control device.

Further advantageous developments can be understood from the accompanying drawing in conjunction with the following specification and claims.

BRIEF DESCRIPTION OF THE DRAWING

The invention is to be described in more detail below with the aid of an embodiment. The associated drawing shows a schematic diagram of a magnetic bearing arrangement with a control device.

DETAILED DESCRIPTION OF THE PREFERRED EMBODIMENT

Figure 1:
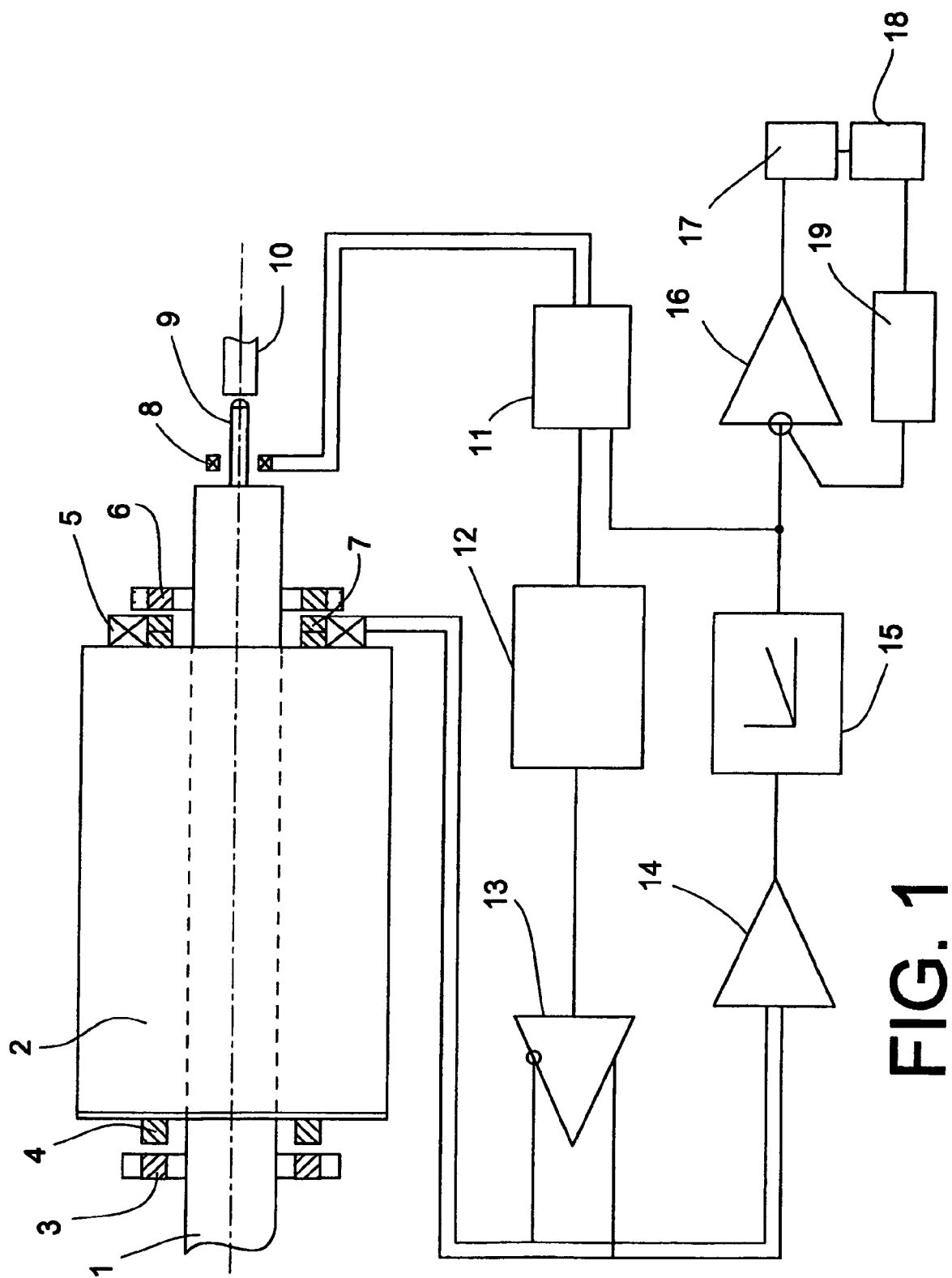

The view in FIG. 1 shows a bearing arrangement of an electromotive drive, in particular for a textile machine. The electromotive drive may be designed as the individual drive of a spinning mechanism, which is used as the drive for a contactlessly mounted rotor 1. The rotor 1 is designed as the rotor of the electromotive drive and is contactlessly supported in the radial and axial direction in the mounting designed as a magnetic bearing arrangement. The magnetic bearing arrangement inter alia comprises bearing magnets 3, 4, 6, 7, designed as permanent magnets, which axially support the shaft of the rotor 1. To achieve a higher rigidity or damping of the mounting of the rotor 1, further active or passive magnets may be provided. However, the use of a gas bearing in combination with a magnetic bearing arrangement is also possible.

The electromotive drive also comprises two catch bearings 10 (of which only one is shown in FIG. 1), which are used for the axial support of the rotor 1, if the electromotive drive is put out of operation. Before initial operation of the electromotive drive, the rotor 1 rests on one of the catch bearings 10 because of a structurally preferred falling direction of the rotor 1 with a stop 9 arranged on the rotor 1. Furthermore, the electromotive drive comprises a stator 2, on which the bearing being used for radial mounting, for example an active magnetic bearing or gas bearing, can be arranged.

The bearing magnets 4, 7 are arranged on a stator 2 and are opposed at a small spacing by the corresponding bearing magnets 3, 6 of the rotor 1. In this manner, pairs of magnets are formed, which are used for the axial and radial support of the rotor 1. The magnet pairs formed from the bearing magnets 3, 4 and 6, 7 in each case have a polarity directed such that the rotor 1 is kept floating between them by a suitable control device, so during stationary operation, an air gap is formed between the respective pairs of magnets. Thus, the rotor 1 during stationary operation of the electromotive drive, is in a force-free floating state, in which the rotor 1 floats axially about a working point. This force-free floating state is also designated the neutral position of the rotor 1. In the neutral position, a substantially equal-sized spacing in the form of a bearing air gap occurs between the rotor 1 and the catch bearings 10.

The size of the bearing air gap occurring between the catch bearings 10 and the rotor 1 is smaller in size than that of the air gaps between the pairs of magnets of the stator 2 and the rotor 1. This is achieved in that at least one of the catch bearings 10 can be adjusted in the axial direction in such a way that the size of the air gaps produced by the arrangement of the rotor 1 and stator 2 in relation to one another in the neutral position of the rotor 1 between the bearing magnets 3, 4 and 6, 7 is fallen below. This means that the bearing magnets 3, 4 and 6, 7, when the electromotive drive is out of operation, do not contact one another when the rotor 1 due to its preferred falling direction rests with its stop 9 on one of the catch bearings 10. The other catch bearing 10 can preferably also be axially adjusted.

The monitoring and determination of the bearing air gap being adjusted between the rotor 9 and the catch bearings 10 during operation takes place by means of the control device, which detects a position change in the rotor 1 deviating from the neutral position and correspondingly, on this basis, counteracts the occurring position change in order to maintain the force-free floating state of the rotor 1 during stationary operation. Position changes of this type are to be attributed, in particular, to external process and disturbing forces, which act on the rotor 1. The weakness due to ageing or damage to the bearing magnets 3, 4, 6, 7 likewise influences the state of equilibrium of the rotor 1 during stationary operation of the electromotive drive.

Furthermore, at least one actuator coil 5, which is in operative connection with the control device, is arranged on the stator 2. The actuator coil 5 can be activated by the control device in such a way that deviations of the force-free floating state of the rotor 1 that occur can be compensated by a defined provision of the actuator coil 5 with electric energy.

The control device also has a sensor coil 8, by means of which the position changes of the rotor 1 are determined in the axial direction, and are passed to a bearing sensor 11 comprising the sensor coil 8. The bearing sensor 11 detects the deviation occurring during stationary operation of the electromotive drive from the neutral position of the rotor 1. Furthermore, the control device comprises a position regulator 12, a power amplifier 13, a differential amplifier 14 and an integrator 15. Adjoining the control device via a connecting line is a control arrangement, which comprises an amplifier 16, an analogue/digital converter 17, a digital control unit 18 and a digital/analogue converter 19. The digital control unit 18 can be designed as a microprocessor or as a computer.

The method according to the invention provides that prior to initial operation of the electromotive drive, the control device and the control device are initially activated. Software which can be used by the digital control unit 18 triggers a process, which causes the actuator coil 5 to be acted upon by a defined current, so the rotor 1 in each case moves once toward the bearing magnets 4 and 7 of the stator 2. In the process, the rotor 1, according to its movement direction, strikes against the respective catch bearing 10, or reaches a position maximally spaced apart from the other catch bearing 10. This is used to determine the extreme values of the bearing stops.

On reaching the stationary operating state of the electromotive drive, in which the rotor 1 is in the force-free floating state, external process and disturbing forces, which may influence the floating state, are compensated by the control device. In the process, the bearing sensor 11 detects the deviations caused by external process and disturbing forces and determined by means of the sensor coil 8 with regard to the neutral position. The output signal (ASLS) of the position sensor 11 is passed on to the position regulator 12, which changes the current to activate the actuator coil 5 in such a way that a reaction force compensating the external process force is produced. The reaction force causes the return of the rotor 1 into its neutral position. The power amplifier 13 is connected downstream from the position regulator 12 to amplify the output signal (ASLR) of the position regulator 12.

The integrator 15 connected parallel to the position regulator 12 integrates the current-proportional output signal (ASLR) of the position regulator 12, the addition of the output signal (ASI) of the integrator 15 to the output signal (ASLS) of the position sensor 1 leading to a displacement of the rotor 1 from its original neutral position until the actuator coil current caused by the output signal (ASLS) of the position sensor 11 has been compensated by the output signal (ASI) of the integrator 15. This is a so-called zero current regulation, which is superimposed on the regulation by the position regulator 12. The output signal (ASLR) of the position regulator 12 is supplied here to the integrator 15 by means of the differential amplifier 14. The output signal (ASI) of the integrator 15 is passed on to compensate the offset error of the position sensor 11 to the latter.

According to the invention, the respective output signal (ASLS) present of the position sensor 11 until the neutral position of the rotor 1 is reached is compensated by the output signal (ASI) of the integrator 15. Thus, the output signal (ASI) of the integrator 15 can be used as a measured value for the deviation of the rotor 1 from the neutral position. The amplitude of the output signal (ASI) of the integrator 15 is in a fixed ratio with respect to the output signal (ASLS) of the position sensor 11, but with a reversed sign. It is possible owing to the determination of the extreme values of the catch bearing stops which took place before the initial operation of the electromotive drive, in conjunction with the output signal (ASI) of the integrator 15 which can be linearised for small bearing air gaps, to determine the size of the bearing air gap and to monitor the changes thereof.

To determine and monitor the change of the bearing air gap, the output signal (ASI) of the integrator 15 is passed to the digital control unit 18 via the amplifier 16 and the analogue/digital converter 17. The digital control unit 18 is designed to process a suitable algorithm, which inter alia allows the storing of the extreme values determined before the initial operation of the electromotive drive and the monitoring and evaluation of the output signal (ASI) of the integrator 15. Thus, to determine the bearing air gap, the values of the output signal (ASI) of the integrator 15 are compared with initially determined limit values, which can be stored according to the design of the magnetic bearing arrangement.

The knowledge of the initially determined extreme values in conjunction with the output signal (ASI) of the integrator 15 allows monitoring of the bearing air gap and the calculation thereof. Specifying the limit values may take place taking into account an emergency switching off of the electromotive drive to the effect that a safety reduction, for example up to a third of the bearing air gap is provided. The limit values are determined from the difference between the bearing air gap measured on the basis of the extreme values and the safety reduction. In other words, when the limit values are passed, the electromotive drive is switched off and, simultaneously, a display of the situation can be initiated, which may, for example, take place in acoustic or visual form.

In addition, the method according to the invention allows evaluation of the state of the magnetic bearing arrangement. The factors, which influence the state of the magnetic bearing arrangement, include above all, the age-related weakening of the bearing magnets 3, 4, 6, 7, which can lead to a working point displacement of the rotor 1 and the wear of the catch bearings 10, which is not to be completely excluded, in the case of emergency switch offs. In order to be able to carry out the state evaluation, reference values are determined, which are produced from the average values of the measured values of the front and rear catch bearing spacing and can be stored in such a way that they can be retrieved during the monitoring and evaluation of the output signal (ASI) of the integrator 15. It can also be provided in this case that when the stored reference values are passed, the electromotive drive is to be switched off. Moreover, the display and storage of the values below the reference value may also be provided in order to be able to display damage to the magnetic bearing arrangement emerging long term.

As already described, the output signal (ASI) of the integrator 15 regulates the current being adjusted at the actuator coil 5 toward zero by compensating the offset error of the bearing sensor 11. The change in the output signal (ASI) of the integrator 15 in this case represents the deviation of the position of the rotor 1. The occurring deviations of the position of the rotor 1 compared to the neutral position are very small in the embodiment described. The same applies to the change in the output signal (ASI) of the integrator 15. For a suitable evaluation of the output signal (ASI) of the integrator 15 said output signal is preferably correspondingly amplified by the amplifier 16 to activate a sensible region in terms of measuring techniques of the analogue/digital converter 17 connected upstream from the digital control unit 18. Dispensing with the amplifier 16 would result in such a low resolution of the output signal (ASI) that the measuring precision required to monitor the bearing air gap would thus only be inadequately provided.

The output signal of the digital/analogue converter 19 is also added to the constantly present offset of the output signal (ASI) of the integrator 15 to compensate the offset of the position sensor 11, which is present at the input of the amplifier 16. The output signal of the amplifier 16 is thus displaced such that it is in the area of the digital control unit 18 which is sensible in terms of measuring techniques. The digital/analogue converter 19 in the embodiment is formed by a low pass in conjunction with a pulse width modulation at the output of the digital control unit 18.

The object of the amplifier 16 is, as already described, to amplify the output signal (ASI) of the integrator 15 in such a way that it is in a sensible area in terms of measuring techniques. However, during the run-up of the electromotive drive until the operating temperature is reached in the stationary operating state, a drift of the output signal (ASLS) of the position sensor 11 occurs. This signal drift is caused by the temperature drift of the position sensor 11 and the temperature behaviour of the components of the electromotive drive. This results in the fact that the amplified output signal (ASI) of the integrator 15, in accordance with the temperature drift of the output signal (ASLS) of the position sensor 11 also experiences a deviation, which leads to the fact that the initially determined working point differs from the actual working point in the stationary operating state. A deviation of the position of the rotor 1 is therefore measured, which, on the basis of the initial measurement of the extreme values, may lead to the electromotive drive being switched off based on a faulty evaluation of the working point.

On the basis of temperature changes, such as emerge during the run-up of the electromotive drive until the operating temperature is reached, a drift of the output signal (ASLS) of the position sensor 11 occurs. This signal drift is caused by the temperature drift of the position sensor 11 and the temperature behaviour of the components of the electromotive drive. The temperature drift and the changes based on the temperature behaviour of the components of the electromotive drive are compensated by changing the pulse width modulation in a time-delayed manner.

The delay is only slightly shorter than the delay occurring during the run-up of the electromotive drive until the operating temperature is reached. It can therefore be assumed that process and disturbing forces occurring, which result in a substantial influencing of the bearing air gap, exert influence with a substantially smaller delay and are therefore recognized.

The invention claimed is:

1. Method for operating an electromotive drive, in particular a single drive of a textile machine, comprising a contactlessly mounted rotor (1), catch bearings (10), wherein the rotor (1) rests on one of the catch bearings (10) prior to initial operation of the electromotive drive, and from which the rotor (1) is spaced apart during stationary operation by a bearing air gap, as well as a control device, which comprises a position sensor (11) and at least one actuator coil (5) and which allows the rotor (1) to be held in a force-free floating state during stationary operation wherein the rotor floats axially about a working point, characterized by the following steps:

inputting an output signal (ASI) generated by an integrator (15) of the control device for maintaining the force-free floating state during operation;

calculating the bearing air gap by evaluating the output signal (ASI);

comparison of the calculated value for the bearing air gap with predeterminable limit values;

switching off the electromotive drive when the limit values are passed.

2. Method according to claim 1, characterized in that before starting up the electromotive drive, to fix limit values, the catch bearing stops are measured to determine the extreme values of the bearing air gap to fix limit values.

3. Method according to claim 2, characterized in that the predeterminable limit values are established below the extreme values determined.

4. Method according to claim 1, characterized in that after each time the electromotive drive is switched off, the measurement of the bearing stops is carried out before the electromotive drive is started up again.

5. Method according to claim 1, characterized in that before the run-up of the rotor (1), a reference value of a working point of the rotor (1) in the floating state is determined, so a deviation of a working point adjusted during stationary operation from this reference value is determined.

6. Method according to claim 5, characterized in that the reference value is determined from the average value of the catch bearing spacings.

7. Method according to claim 5, characterized in that the reference value of the working point of the rotor (1) in the floating state is predetermined when the rotor (1) has reached its operating speed.

8. Method according to claim 5, characterized in that the switching off of the electromotive drive is brought about by a defined deviation of the working point adjusted in each case in stationary operation from the reference value.

9. Method according claim 1, characterized in that the output signal (ASI) is linearised for small bearing air gaps.

10. Method according to claim 1, characterized in that to evaluate the output signal (ASI), the control device is in operative connection with a control arrangement.

11. Method according to claim 10, characterized in that to amplify the output signal (ASI), the control arrangement has a differential amplifier (16).

12. Method according to claim 11, characterized in that the input of the differential amplifier (16) is loaded with an additional pulse width-modulated signal, which is produced by the control arrangement.

13. Method according to claim 12, characterized in that to compensate the deviations occurring during the transition of the operating state of the electromotive drive from the time of the run-up until the stationary operating state is reached, from the state of equilibrium in the floating state of the rotor (1), the pulse width modulation of the signal is changed with a time delay.

14. Electromotive drive, in particular for a textile machine, comprising a contactlessly mounted rotor (1), catch bearings (10), wherein the rotor (1) rests on one of the catch bearings (10) prior to initial operation of the electromotive drive, and from which the rotor (1) is spaced apart during stationary operation by a bearing air gap, as well as a control device, which comprises a position sensor (11) and at least one actuator coil (5) and which allows the rotor (1) to be held in a force-free floating state during stationary operation wherein the rotor floats axially about a working point, characterized in that the position sensor (11) has with at least one sensor coil (87), the at least one actuator coil (5) is can be provided with, electrical energy in a defined manner, the control device further comprises a position controller (12) and an integrator (15), at which an output signal (ASI) is picked up, the control device is connected to a control arrangement to evaluate the output signal (ASI) and calculate the bearing air gap and the control arrangement is set up to compare the calculated value for the bearing air gap with predeterminable limit values and to switch off the electromotive drive when the limit values are passed.

15. Electromotive drive according to claim 14, characterized in that the control arrangement comprises a digital control unit (18).

16. Electromotive drive according to claim 15, characterized in that the control arrangement comprises an amplifier (16), an analogue/digital converter (17) and a digital/analogue converter (19), via which the control unit (18) can be connected to the control device.

17. Electromotive drive according to claim 14, characterized in that for contactless mounting of the rotor (1), the mounting is designed as a magnetic bearing arrangement.

18. Electromotive drive according to claim 14, characterized in that for contactless mounting of the rotor (1), the mounting is designed as a combination of a magnetic and a gas bearing arrangement.

19. Electromotive drive according to claim 14, characterized in that the rotor (1) is designed as a spinning rotor.

20. Electromotive drive according to claim 14, characterized in that the drive is designed as a drive for a rotor spinning machine.

* * * * *